United States Patent [19]

Hattori et al.

[11] Patent Number: 5,013,126
[45] Date of Patent: May 7, 1991

[54] WATERPROOF OPTICAL FIBER CABLE

[75] Inventors: Tomoyuki Hattori; Nobuhiro Akasaka; Toru Yamanishi, all of Yokohama, Japan

[73] Assignee: Sumitomo Electric Industries Ltd., Osaka, Japan

[21] Appl. No.: 594,544

[22] Filed: Oct. 9, 1990

[30] Foreign Application Priority Data

Oct. 9, 1989 [JP] Japan .................................. 1-262096
Oct. 9, 1989 [JP] Japan .................................. 1-263583

[51] Int. Cl.⁵ .................. G02B 6/44; H02G 15/00
[52] U.S. Cl. .................... 350/96.23; 350/96.33; 350/96.34; 523/173
[58] Field of Search ........... 350/96.10, 96.23, 96.33, 350/96.34; 174/70 R, 110 SR, 22 R, 23 R, 23 C; 252/582, 583; 523/173

[56] References Cited

U.S. PATENT DOCUMENTS

| | | |
|---|---|---|
| 4,370,023 | 1/1983 | Lange et al. ................. 350/96.23 |
| 4,388,435 | 6/1983 | Zeidler et al. ............... 350/96.23 X |
| 4,401,366 | 8/1983 | Hobe .......................... 350/96.23 |
| 4,596,443 | 6/1986 | Diemeer et al. .............. 350/96.23 |
| 4,645,298 | 2/1987 | Gartside, III ................ 350/96.23 |
| 4,701,015 | 10/1987 | Saito et al. ................. 350/96.23 |
| 4,701,016 | 10/1987 | Gartside, III et al. ........ 350/96.23 |
| 4,703,997 | 11/1987 | Ijiri et al. ................. 350/96.23 |
| 4,703,998 | 11/1987 | Uchioke et al. .............. 350/96.23 |
| 4,711,523 | 12/1987 | Iri et al. ................... 350/96.23 |
| 4,767,184 | 8/1988 | Ogasawara et al. ............ 350/96.23 |
| 4,815,813 | 3/1989 | Arroyo et al. ............... 350/96.23 |
| 4,913,517 | 4/1990 | Arroyo et al. ............... 350/96.23 |
| 4,971,419 | 11/1990 | Gartside et al. ............. 350/96.23 |

*Primary Examiner*—Brian Healy
*Attorney, Agent, or Firm*—Cushman, Darby & Cushman

[57] ABSTRACT

A waterproof optical fiber cable comprising at least one coated optical fiber and a waterproof compound surround said at least one coated optical fiber, wherein a swelling degree of a coating material of the optical fiber induced by said waterproof compound is not larger than 10%, which optical fiber cable has stable performances.

5 Claims, 1 Drawing Sheet

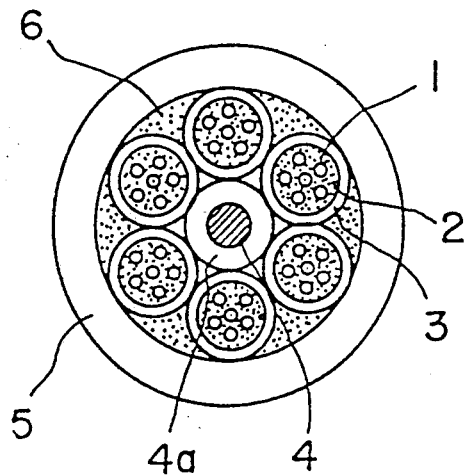
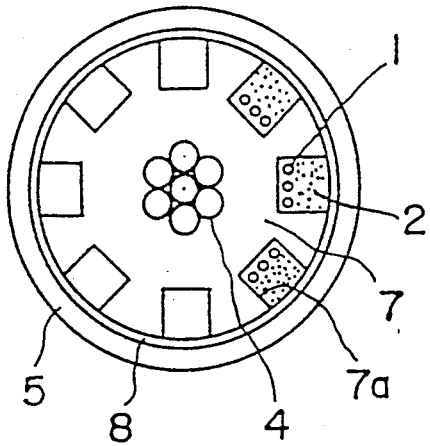
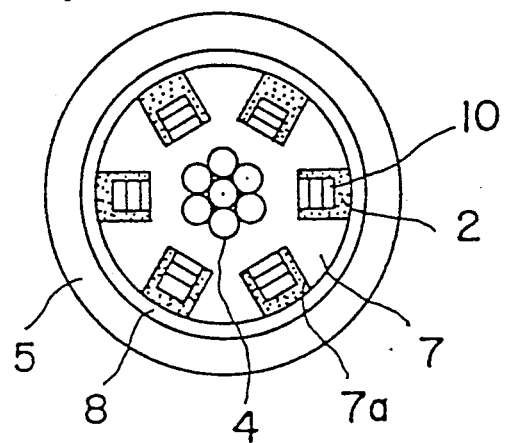
Fig. 4
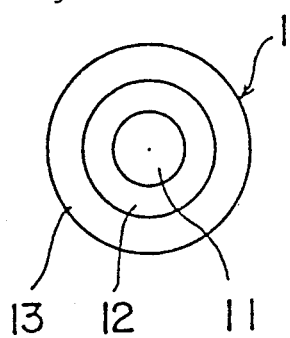
Fig. 1A
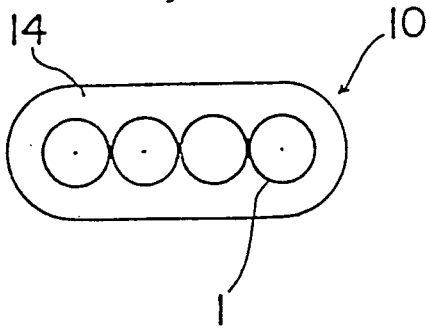
Fig. 1B

WATERPROOF OPTICAL FIBER CABLE

BACKGROUND OF THE INVENTION

1. Field of the Invention

The present invention relates to a water proof optical fiber cable for optical communication.

2. Description of the Related Art

A waterproof communication cable which comprises stranded element wires each comprising a copper conductor coated with a plastic coating such as polyethylene- and polypropylene, a waterproof compound filled in spaces in the cable and an outer sheath is used as a maintenance-free communication cable. As the waterproof compound, a compound comprising a polybutene base oil and low molecular weight polyethylene, a compound comprising a petrolatum base oil and low molecular weight polyethylene and the like are known. As disclosed, for example, in Japanese Patent Kokai Publication No. 202015/1982, the waterproof compound is heated and molten and poured in the spaces in the cable. since the conventional waterproof compound is filled in the cable space in the molten state, in case of an optical fiber cable, volume shrinkage of the waterproof compound during cooling generates short period small bending, namely microbending on each optical fiber and increases light transmission loss.

As a waterproof compound for an optical fiber cable Japanese Patent Kokai Publication No. 126706/1986 discloses a waterproof compound for an optical fiber cable comprising a synthetic oil and optionally a mineral oil, and Japanese Patent Kokai Publication No. 8777/1983 discloses a waterproof compound for an optical fiber cable comprising a mineral oil and hydrophobic silica.

In addition to the already described problem encountered in the production of the waterproof optical fiber cable, the conventional waterproof optical fiber cables have following three problems:

(A) Increase of transmission loss at low temperatures.
(B) Deterioration of a coating material of the optical fiber,
(C) Bleeding of the waterproof compound from cable ends.

A cause for the problem (A), namely the increase of transmission loss at low temperature is that the waterproof compound solidifies and shrinks at low temperature and tightens the optical fiber to generate the microbending on the optical fiber.

A cause for the problem (B), namely the deterioration of the coating material of the optical fiber, is that an oil component which is the main component of the waterproof compound tends to penetrate in the coating material of the optical fiber and swells or deteriorates the coating material, since the oil component is a hydrocarbon base oil. For example, it is known from Japanese Patent Kokai No. 100036/1988 that an oil in the waterproof compound penetrates in the coating material of the optical fiber to generate stress therein, whereby the microbending is generated on the optical fiber. To solve such problem, it is proposed to reduce influence of the oil to the coating material by decreasing amounts of aromatic components in the oil and polarity of the oil as much as possible (see, for example, Japanese Patent Kokai Publication No. 213813/1986). Since water absorbance of the coating material of the optical fiber is made low recently and polarity of the coating material is made smaller than ever, it is difficult to prevent swelling of the coating material by suppressing the polarity of the oil component.

The bleeding of the waterproof compound from the cable ends (C) means flowing out of the waterproof compound as such or the oil component in the waterproof compound from the cable ends and decreases workability or makes it impossible to connect the optical fibers.

Hitherto, no waterproof compound can solve all the above problems (A), (B) and (C).

SUMMARY OF THE INVENTION

An object of the present invention is to provide a waterproof optical fiber cable which does not suffer from increase of transmission loss at low temperature.

Another object of the present invention is to provide a waterproof optical fiber cable in which a coating material of the optical fiber is not deteriorated.

A further object of the present invention is to provide a waterproof optical fiber cable from which a waterproof compound does not bleed out.

According to the present invention, there is provided a waterproof optical fiber cable which comprises at least one coated optical fiber and a waterproof compound surrounding said at least one coated optical fiber wherein a swelling degree of a coating material of the optical fiber induced by said waterproof compound is not larger than 10%.

The waterproof compound preferably contains no oil component having a molecular weight of smaller than 300. In addition, the waterproof compound preferably has a cone penetration value of at least 200 at $-40°$ C and not larger than 450 at $80°$ C.

BRIEF DESCRIPTION OF THE DRAWINGS

FIGS. 1A and 1B show cross sections of coated optical fibers, and

FIGS. 2, 3 and 4 show cross sections of preferred embodiments of the waterproof optical fiber cable according to the present invention.

DETAILED DESCRIPTION OF THE DRAWINGS

FIGS. 1A and 1B show cross sections of optical fibers. The single optical fiber 1 of FIG. 1A comprises a bare optical fiber 11 for light transmission and two coating layers 12 and 13. The bare optical fiber 11 may be made of quartz glass, and the coating layer 13 may be neglected. The multiple optical fiber 10 of FIG. 1B comprises plural single optical fibers 1 and an outer coating layer 14 which bundles the optical fibers 1. The optical fiber 10 may be called as a coated optical fiber tape.

The coating layers 12, 13 and 14 of the optical fibers 1 and 10 protect the bare optical fiber 11 from damage and impart flexibility to the fibers. Examples of a coating layer material are urethane-acrylate base resin, epoxy-acrylate resin, silicone-acrylate resin, fluoride-acrylate resin and the like.

The waterproof compound comprises an oil component (e.g. silicone oil, polybutene oil, α-olefin oil, mineral oil, etc.), a thickening agent (e.g. silica, bentonite, clay, etc.) and an agent for preventing oil separation (e.g. styrene base block copolymers, etc.). The waterproof compound may further comprise other conventional additives such as an antioxidant and an ultraviolet light stabilizer.

To decrease the swelling degree of the coating material with the waterproof compound to 10% or less, a molecular weight of the oil component is suitably selected as seen from Examples below.

The swelling degree is expressed by a percentage of a weight of a solvent (oil component) absorbed by a material based on an initial weight of the material.

With the conventional waterproof compound, the oil component penetrates in the coating material of the optical fiber. Thereby, the stress is generated in the coating layer so that the transmission loss is increased as explained above. In addition, when the oil component reaches an interface between the optical fiber glass and the coating layer, a force required for pulling out the optical fiber glass from the coating material is decreased, this resulting in difficulty in connection of the optical fibers. The above problems are mainly caused by the swelling of the coating material of the optical fiber due to penetration of the oil component in the waterproof compound. However, when the swelling degree of the coating material of the optical fiber induced by the waterproof compound is not larger than 10%, the optical fiber cable has stable properties.

A manner for suppressing the swelling degree to 10% or less is explained. When a crosslink density in the coating material is increased, swelling of the coating material can be prevented. However, the increase of crosslink density leads to decrease of elongation and increase of cure shrinkage. Therefore, the coating material having the increased crosslink density is unsuitable. In the course of the study, it has been found that the oil component having a molecular weight of smaller than 300 penetrates in the coating material of the optical fiber. Then, the use of an oil component containing no component having the molecular weight of smaller than 300, in particular a synthetic oil such as α-olefin oil, or a mineral oil from which such low molecular component is removed can provide the stable waterproof optical fiber cable.

In a preferred embodiment, the waterproof compound has a cone penetration value of at least 200 at −40° C. and not larger than 450 at 80° C. When the cone penetration value is smaller than 200 at −40° C., the transmission loss increases at low temperature. When the cone penetration value exceeds 450 at 80° C., drip occurs at high temperature.

The waterproof compound having the above range cone penetration can be prepared by selecting the oil component and the thickening agent and also a ratio of these two components.

The cone penetration is a criteria of hardness of the waterproof compound which is determined according to JIS K 2220. The smaller cone penetration value means larger hardness.

To obtain the waterproof compound having such cone penetration, an oil having a pour point of −30° C. or lower, or an oil having an average molecular weight of 3000 or smaller is preferably used.

PREFERRED EMBODIMENTS OF THE INVENTION

Now, the preferred embodiments of the waterproof optical fiber cable of the present invention will be explained.

FIG. 2 is a cross section of a first embodiment of the waterproof optical fiber cable of the present invention.

Six coated optical fibers as shown in FIG. 1A are contained in an polyamide tube 3 having an inner diameter of 1.4 mm and an outer diameter of 2.0 mm to form a so-called loose tubes. In the tube 3, the waterproof compound 2 of the present invention is filled.

The coated optical fiber 1 comprises a single mode optical fiber having a diameter of 125 μm and two coating layers made of a UV curable resin having an outer diameter of 250 μm.

Plural loose tubes, for example, six loose tubes as shown in FIG. 2 are stranded around a tension member 4 having a plastic coating 4a at a suitable pitch. In gaps between pitches, the conventional polybutene base waterproof compound 6 is filled. Around the stranded loose tubes, an outer coating layer 5 is formed by extrusion to produce a waterproof optical fiber cable.

Seven waterproof optical fiber cables were produced by changing the kinds of the waterproof compounds filled in the polyamide tube 3. The molecular weight distribution, the cone penetration and the swelling degree of the coating material at room temperature are shown in Table 1. The sample Nos. A and D used the waterproof compounds according to the present invention, while the sample Nos. E, F and G were comparative. "X" and "Y" stand for the resins used in the first and second coating layers, respectively and both are urethane-acrylate resins.

TABLE 1

| Sample No. | A | B | C | D | E | F | G |
|---|---|---|---|---|---|---|---|
| Composition*1 (wt. %) | | | | | | | |
| α-Olefin oil | 74 | 86 | | | | 88 | 92 |
| Polybutene oil | | | | | 92 | | |
| Mineral oil | | | | 83 | | | |
| Silicone oil | | | 87 | | | | |
| Colloidal silica | 10 | 7 | 8 | 10 | 3 | 7 | 3 |
| Styrene base copolymer | 15 | 6 | 4 | 6 | 4 | 4 | 4 |
| Antioxidant | 1 | 1 | 1 | 1 | 1 | 1 | 1 |
| Molecular weight distribution | 350–3500 | 350–3500 | 900–10000 | 400–4000 | 200–2500 | 200–3000 | 200–3000 |
| Cone penetration at | | | | | | | |
| 80° C. | 378 | 343 | 340 | 399 | 463 | 299 | 470 |
| 50° C. | 375 | 341 | 300 | 392 | 440 | 271 | 448 |
| 25° C. | 360 | 338 | 283 | 377 | 392 | 255 | 395 |
| 0° C. | 351 | 318 | 274 | 350 | 384 | 236 | 365 |
| −20° C. | 336 | 303 | 249 | 339 | 309 | 203 | 347 |
| −40° C. | 315 | 283 | 239 | 242 | 197 | 187 | 309 |
| Swelling degree (wt. %) | | | | | | | |
| Resin X | 7.3 | 4.9 | 3.5 | 6.1 | 12.4 | 10.5 | 10.5 |

TABLE 1-continued

| Sample No. | A | B | C | D | E | F | G |
|---|---|---|---|---|---|---|---|
| Resin Y | 3.2 | 2.0 | 1.4 | 2.4 | 9.6 | 8.4 | 8.4 |

Note:*1
α-Olefin oil:
Polybutene oil:
Mineral oil:
Silicone oil:
Styrene base copolymer:
Antioxidant:

The original transmission loss at −40° C. with light having a wavelength of 1.55 μm and the results of the drip test are shown in Table 2.

The drip test was conducted according to Bellcore Specification TR-TSY-000020 at 65° C.

With each of the produced waterproof optical cables, after six months, change of the transmission loss and change of the force required for pulling out the optical fibers from the polyamide imide tube were evaluated. The results are shown in Table 2.

TABLE 2

| Sample No. | A | B | C | D | E | F | G |
|---|---|---|---|---|---|---|---|
| Transmission loss at −40° C. (dB/km)*1 | +0.02 | +0.03 | +0.02 | +0.03 | +0.13 | +0.21 | +0.02 |
| Drip test*2 | O | O | O | O | X | O | X |
| Change of force required for pulling out optical fiber (%) | −16 | +5 | +10 | −14 | −65 | −50 | −55 |
| Change of transmission loss after six months | No | No | No | No | Yes | Yes | Yes |

Note:
*1 An average value of six coated optical fibers in comparison with transmission loss at 25° C.
*2 O: Pass, X: Fail.

The above results confirmed that the waterproof compounds according to the present invention are suitable for waterproofing the optical fiber cable, since the transmission loss at −40° C. does not increase significantly and the compound does not bleed out from the cable end.

FIG. 3 shows a cross section of a second embodiment of the waterproof optical fiber cable of the present invention. In this embodiment, the plural coated optical fibers 1 are contained in each groove 7a formed on a perifibers phery of a spacer 7 which has a tension member 4 at its center. Each groove 7a is filled with the waterproof compound 2 of the present invention. Around the spacer 7, a wrapping tape 8 is wound. Further, around the wrapped tape 8, an outer coating layer 5 is provided.

FIG. 4 shows a cross section of a third embodiment of the waterproof optical fiber cable of the present invention, which is substantially the same as that of FIG. 3 except that the coated optical fibers 10 of FIG. 1B are contained in each groove 7a.

What is claimed is:

1. A waterproof optical fiber cable which comprises at least one coated optical fiber and a waterproof compound surrounding said at least one coated optical fiber, wherein a swelling degree of a coating material of the optical fiber induced by said waterproof compound is not larger than 10%.

2. The waterproof optical fiber cable according to claim 1, wherein said waterproof compound comprises an oil component, a thickening agent and an agent for preventing oil separation.

3. The waterproof optical fiber cable according to claim 2, wherein said waterproof compound contains no oil component having a molecular weight of smaller than 300.

4. The waterproof optical fiber cable according to claim 1, wherein said waterproof compound has a cone penetration of at least 200 at −40° C. and not larger than 450 at 80° C.

5. The waterproof optical fiber cable according to claim 4, wherein said waterproof compound comprises an oil component having a pour point of not higher than −30° C.

* * * * *